United States Patent [19]

Moore, Jr. et al.

[11] Patent Number: 5,115,798
[45] Date of Patent: May 26, 1992

[54] CONDENSATE TRAP

[75] Inventors: Henry J. Moore, Jr., Playa Del Rey; Bijan Gidanian, Granada Hills, both of Calif.

[73] Assignee: Mor-Flo Industries, Inc., Cleveland, Ohio

[21] Appl. No.: 742,329

[22] Filed: Aug. 8, 1991

[51] Int. Cl.⁵ .............................................. F24H 1/00
[52] U.S. Cl. ................... 126/351; 126/110 R; 126/361; 137/192
[58] Field of Search ................. 126/110 R, 99 R, 362, 126/116 R, 360 R, 110 C, 351, 361; 137/192, 132, 314, 409; 122/17, 20 B, 121, 182 S

[56] References Cited

U.S. PATENT DOCUMENTS

| | | | |
|---|---|---|---|
| 2,598,706 | 6/1952 | Manning | 137/192 |
| 3,028,843 | 4/1962 | Carlson et al. | 122/149 |
| 4,356,794 | 11/1982 | Bouman et al. | 122/158 |
| 4,449,484 | 5/1984 | Sakamoto et al. | 122/13 R |
| 4,531,509 | 6/1985 | Wilhelm, Jr. | 126/362 |
| 4,541,410 | 7/1985 | Satana | 126/362 |
| 4,627,460 | 12/1986 | Eising | 137/192 |
| 4,682,579 | 7/1987 | Bigham | 126/110 R |
| 4,729,328 | 3/1988 | Shellenberger | 110/93 |
| 4,742,842 | 5/1988 | Garneau et al. | 137/192 |
| 4,745,942 | 5/1988 | Delwiche | 137/192 |
| 4,766,883 | 8/1988 | Cameron et al. | 126/351 |
| 4,856,550 | 8/1989 | Smelcer | 126/110 R |

FOREIGN PATENT DOCUMENTS 7939 of 1908 United Kingdom ................ 137/192

Primary Examiner—James C. Yeung
Attorney, Agent, or Firm—Body, Vickers & Daniels

[57] ABSTRACT

A condensate trap in the exhaust gas conduit of a forced draft water and space heater comprises a housing providing a chamber open at its upper end to the exhaust conduit and having a condensate outlet below the inlet and controlled by a float valve in the chamber.

29 Claims, 4 Drawing Sheets

CONDENSATE TRAP

BACKGROUND OF THE INVENTION

The present invention relates to the art of forced draft water and space heating apparatus and, more particularly, to an improved condensate trap for such apparatus.

A condensate trap in accordance with the present invention finds particular utility in conjunction with the disposal of condensate flowing with exhaust gases through the exhaust gas conduit of a forced draft water heater and, accordingly, the invention will be disclosed and described in detail herein in connection with such a water heater. At the same time, it will be understood that the condensate trap can be used with other types of forced draft apparatus, such as space heaters, and with forced draft water heaters other than that with which the trap is disclosed herein.

It is of course well known in connection with forced draft water and space heating apparatus that the products of combustion in flowing through a heat exchanger in the apparatus transfer heat to a fluid medium surrounding the heat exchanger and, in doing so, are cooled, whereby liquid condensate will form during the heat extraction process. The condensate is collected and directed from the heat exchanger to a drain or the like and, typically, such disposal of the condensate has been achieved heretofore through the use of a standard U-type drain trap such as that illustrated, for example, in U.S. Pat. No. 4,541,410. The purpose of the trap is to provide for the disposal of condensate and, at the same time, preclude the escape of exhaust gases through the condensate trap. However, if the apparatus is not used for long periods of time, the condensate in the trap can evaporate and this results in the undesired escape of exhaust gases through the trap. Such U-type trap arrangements are also disadvantageous for the reason the legs of the U have to be of considerable length to preclude the condensate being blown from the trap to the drain conduit by the pressure of the exhaust gases. More particularly in this respect, it will be appreciated that the required length of the legs of the U is dependent on the exhaust gas pressure and, accordingly, increases as the exhaust pressure increases, whereby a considerably long trap may be required to preclude the condensate being blown from the trap.

Another disadvantage of U-type traps in connection with forced draft apparatus of the foregoing character is the fact that the drain tube is relatively small in diameter, whereby the bridging portion of the U between the upwardly extending legs thereof can readily become blocked by the accumulation and hardening of minerals and other contaminates in the water which settle therein and harden during periods of non-use. Accordingly, care must be taken to periodically clean the trap to preclude blockage thereof, which blockage would cause the condensate to backup into the exhaust gas conduit. In fact, to preclude potential damage to the heating apparatus as the result of such a condition, it is contemplated in U.S. Pat. No. 4,729,328 to provide a float valve in the condensate trap which will shut down the heating apparatus in the event of blockage of condensate flow through the exhaust line.

Another arrangement heretofore provided for controlling condensate flow is disclosed in U.S. Pat. No. 4,449,484 wherein a solenoid valve is provided for a condensate collector to provide for the discharge of condensate therefrom following operation of the heating apparatus. The valve remains open when the apparatus is shut down and closes when the apparatus is in operation, whereby condensate is collected without discharge during operation of the apparatus. In addition to the cost of installing, maintaining and operating such a solenoid valve in conjunction with the apparatus, there is the potential during operation of the apparatus for a sufficient quantity of condensate to accumulate in the collector to the level of the exhaust conduit and, therefore, either be blown through the latter with the exhaust gases, or block the exhaust passage to the flow of exhaust gases, both of which are undesirable and potentially dangerous conditions. Furthermore, should the normally open valve fail to close when the apparatus is in operation, exhaust gases are undesirably free to flow through the condensate outlet.

SUMMARY OF THE INVENTION

In accordance with the present invention, an improved condensate trap is provided for forced draft heating apparatus which overcomes the problems and disadvantages referred to above in connection with such traps heretofore available. More particularly in this respect, a condensate trap according to the present invention is structurally compact and reliable in operation, and will remain closed in the event that condensate in the trap evaporates between successive operations of the heating apparatus, whereby exhaust gases cannot escape through the condensate drain even when there is no condensate in the trap. Furthermore, the trap is capable of opening during operation of the apparatus so as to preclude the possibility of condensate buildup in the trap which would result in blowing of the condensate through the exhaust conduit.

The foregoing advantages are achieved in accordance with the present invention by providing for the trap to be opened and closed by a valve responsive to the level of condensate in the trap. Preferably, the valve is float controlled to open in response to a predetermined level of condensate in the trap, whereby it will be appreciated that the condensate level can be controlled to preclude a buildup sufficient to cause blowing of the condensate through the exhaust conduit with the exhaust gases. Moreover, when the condensate level recedes, the valve closes and exhaust gases cannot escape through the condensate trap outlet in the event that there is little or no condensate in the trap. In accordance with preferred embodiments of the invention, the float valve is biased closed by the pressure of exhaust gases thereagainst, and this further enhances closure of the valve to preclude the escape of exhaust gases through the trap, even when there is no condensate in the trap. Further in accordance with preferred embodiments, the trap can be constructed primarily from off-the-shelf plastic pipe and plastic pipe couplings which provide for the trap to be both quickly and economically constructed.

It is accordingly an outstanding object of the present invention to provide an improved condensate trap for use with forced draft heating apparatus of the character wherein condensate is formed in and carried through the exhaust conduit for the products of combustion.

Another object is the provision of a condensate trap of the foregoing character which is adapted to remain closed in the event there is little or no condensate in the trap, thus to preclude the flow of exhaust gases through the condensate trap outlet.

Yet a further object is the provision of a condensate trap of the foregoing character which is adapted to open and close in response to the level of condensate in the trap so as to preclude an accumulation of condensate in the trap which could result in condensate being blown through the exhaust conduit with the exhaust gases.

Still another object is the provision of a condensate trap of the foregoing character which precludes the blowing of condensate through the condensate outlet, regardless of the pressure of the exhaust gases flowing through the exhaust gas conduit.

Still a further object is the provision of a condensate trap of the foregoing character which is structurally compact and reliable in operation and is economic to manufacture both from the standpoint of the cost of component parts and the assembly time required.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings wherein.

DESCRIPTION OF PREFERRED EMBODIMENTS

Figure 1:
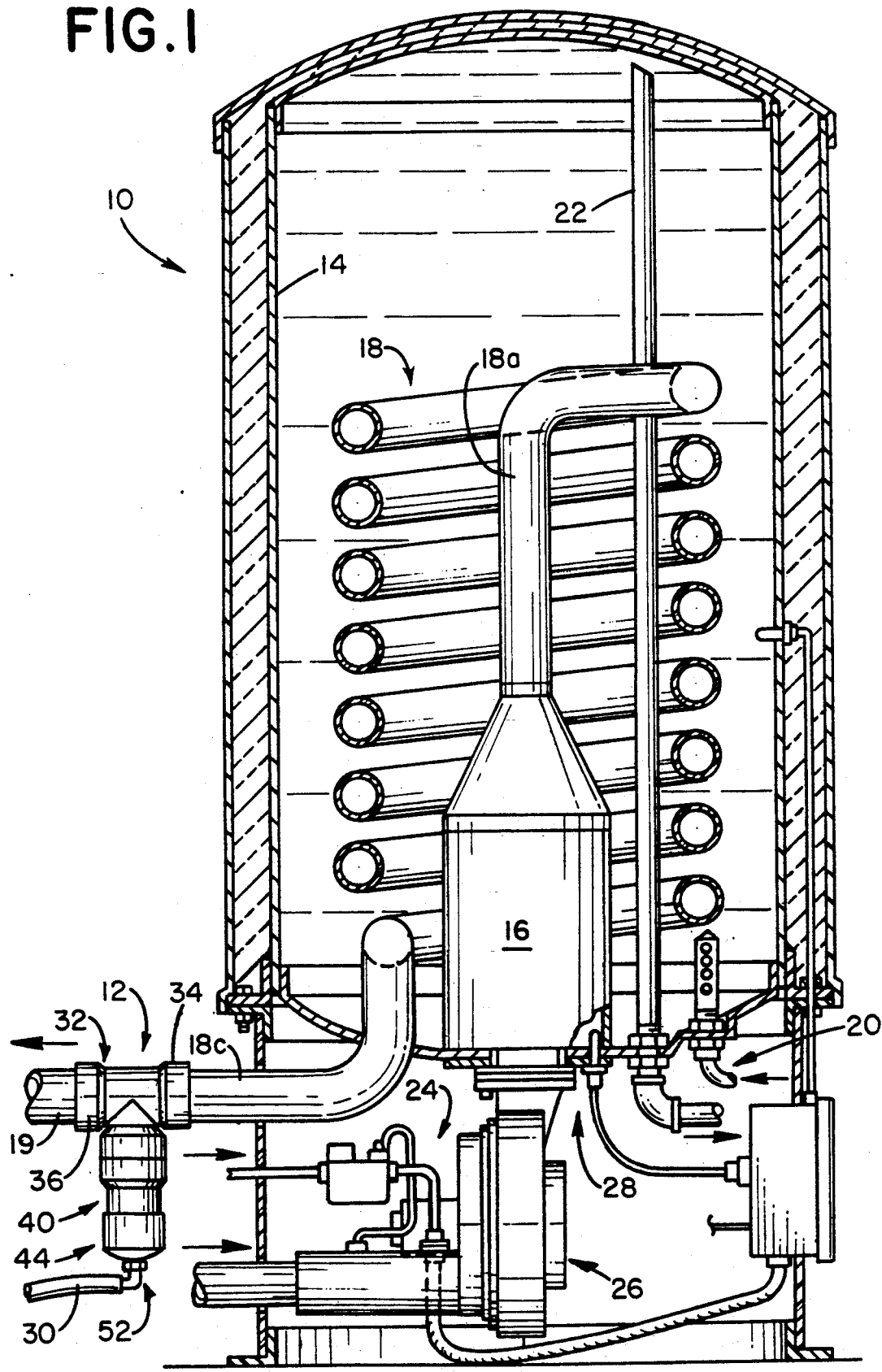
FIG. 1 is a side elevation view, partially in section, of a forced draft water heater having a condensate trap in accordance with the present invention in the exhaust conduit thereof.

Referring now in greater detail to the drawings wherein the showings are for the purpose of illustrating preferred embodiments of the invention only, and not for the purpose of limiting the invention, a gas fired, forced draft water heater 10 is illustrated in FIG. 1 of the drawing as having an exhaust gas conduit provided with a condensate trap 12 in accordances with the present invention. The structure and operation of water heater 10 is illustrated and described in detail in U.S. Pat. No. 4,766,883 to Cameron et al which is assigned to the same assignee as the present invention and the subject matter of which patent is incorporated herein by reference. Briefly, for purposes of understanding the present invention, water heater 10 is comprised of a water containing tank 14 supporting a combustion chamber 16 and an exhaust gas conduit 18 having an entrance end 18a extending upwardly from combustion chamber 16, a downwardly spiralling portion 18b, and an exit end 18c. Condensate trap 12 is interposed between exit end 18c of exhaust gas conduit 18 and an exhaust conduit 19 by which exhaust gases are directed to a location outside the building or the like where the heater is located. Heater 10 further includes a cold water inlet 20 and a hot water outlet pipe 22 in tank 14, and a fuel gas regulator 24 and blower 26 by which a fuel-air mixture is introduced into combustion chamber 16 for ignition by an igniter 28, as fully explained in the foregoing patent to Cameron et al. In operation, the heat of combustion in combustion chamber 16 heats the body of water surrounding the combustion chamber, and the hot products of combustion exit the combustion chamber through exhaust conduit 18. The exhaust conduit conveys the exhaust gases on a helically downwardly spiralling path through the body of water, transferring heat thereto, whereby condensate is formed in the exhaust gases as they flow through conduit 18 toward exit end 18c thereof. At exit end 18c, the condensate is collected in condensate trap 12 and is periodically discharged therefrom, as described hereinafter, for flow to a floor drain or the like such as through flexible drain hose 30.

Figure 2:
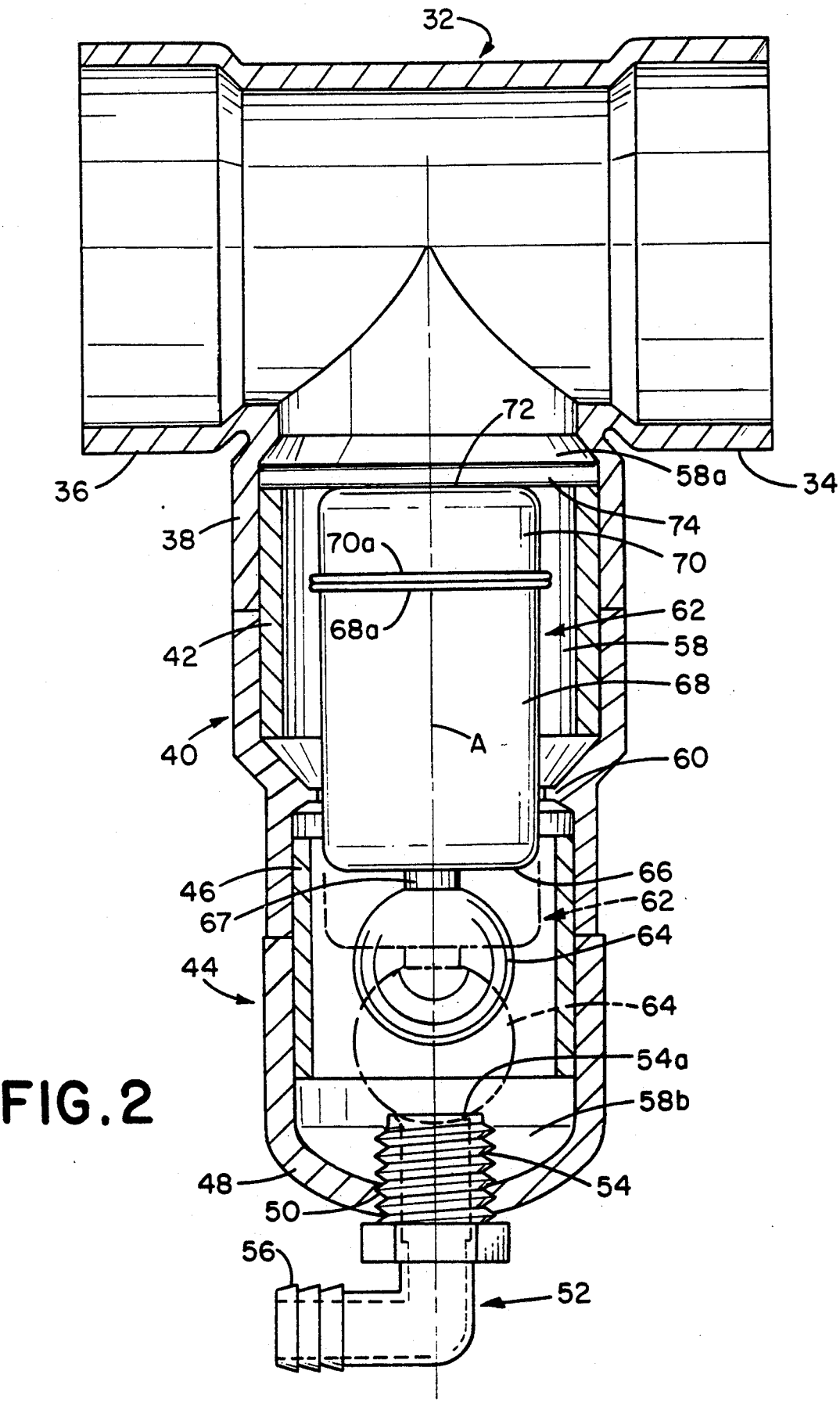
FIG. 2 is an enlarged sectional elevation view of the condensate trap shown in FIG. 1.
Figure 3:
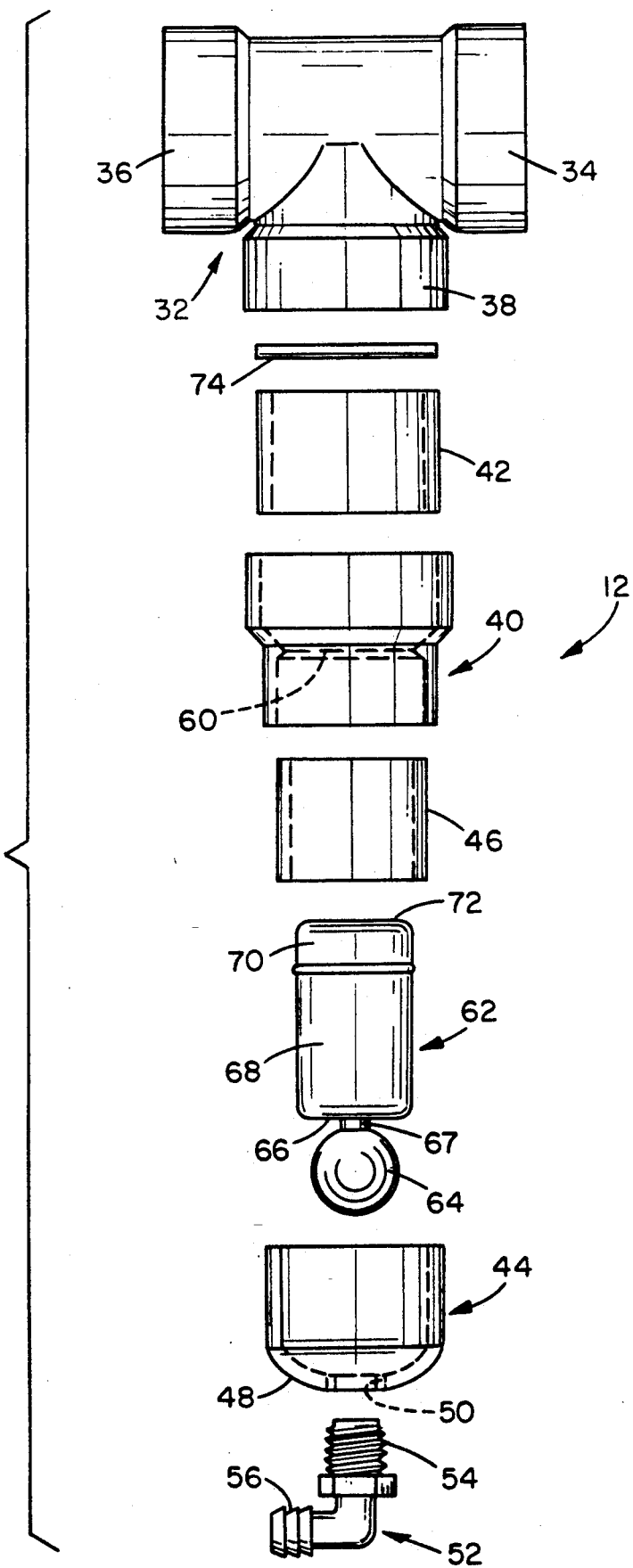
FIG. 3 is an exploded view of the component parts of the condensate trap shown in FIG. 2; and, FIG. 4 is an enlarged sectional elevation view of another embodiment of a condensate trap in accordance with the invention.

Referring now to FIGS. 2 and 3 of the drawing, condensate trap 12 is comprised of a housing which, in the preferred embodiments, is constructed from off-the-shelf plastic pipe and coupling components including a T-coupling 32 having ends 34 and 36 for connection respectively to exit end 18c of exhaust conduit 18 and to exhaust conduit 19. Preferably, ends 34 and 36 of T-coupling 32 are internally smooth to facilitate installation of the condensate trap by adhesively bonding the ends of the T-coupling to exit end 18c and exhaust conduit 19. T-coupling 32 includes a downwardly extending branch 38 adhesively bonded to a plastic reducer coupling 40 by means of a sleeve of plastic pipe 42 therebetween. The condensate trap housing further includes a standard plastic end cap 44 adhesively interconnected with the lower, reduced diameter portion of reducer 40 by means of a sleeve of plastic pipe 46 therebetween. End cap 44 includes an arcuate end wall 48 which is provided with an internally threaded opening 50 coaxial with the coupling components of the housing, and a tubular L-coupling 52 has an externally threaded leg 54 threadedly interengaged with internally threaded opening 50 to provide an outlet passage for condensate trap 12. The other leg of coupling 52 is provided with serrations 56 which, as is well known, facilitate the connection of discharge hose 30 to the trap outlet.

The interior of the housing of condensate trap 12 as defined by T-coupling branch 38, reducer 40 and end cap 44 provides a condensate chamber 58 having an upper end 58a providing a condensate inlet which is open to the exit end of exhaust conduit 18 and a lower end 58b which is below the inlet and provided with the condensate outlet as defined by L-coupling 52. Reducer 40 has a radially inwardly extending circumferential flange 60 intermediate the larger and smaller diameter ends thereof, which flange is standard in off-the-shelf plastic pipe couplings, and which flange serves the purpose set forth more fully hereinafter.

A condensate level responsive float 62 is disposed in condensate chamber 58, and a spherical valve element 64 is secured to the bottom 66 of float 62 by a stem 67 for displacement therewith. Float 62 and valve element 64 are vertically displaceable in chamber 58 along a vertical axis A which is coaxial with the outlet passage from chamber 58 provided by leg 54 of coupling 52. More particularly in this respect, the open upper end 54a of leg 54 provides a valve seat which is engaged and disengaged by valve element 64 to respectively close and open the outlet passage from chamber 58 as described in greater detail hereinafter. Float 62 is of course hollow and, preferably, formed from plastic material. In the embodiment illustrated, the float is comprised of lower and upper cup-shaped components 68 and 70, respectively, having corresponding peripheral flanges 68a and 70a adhesively bonded together to seal the interior of the float against leakage. Preferably, float 62 has an external diameter in cross-section closely corresponding to the internal diameter of flange 60 of reducer 40, whereby the latter serves to guide vertical displacement of float 62 relative to axis A. Furthermore, float 62 has a flat upper end 72 adjacent entrance end 58a of chamber 58 for the purpose set forth hereinafter. A stop pin 74 is interposed between sleeve 42 and the upper end of branch 38 to limit upward displacement of float 62 in chamber 58.

In operation, float 62 and spherical valve element 64 are vertically displaceable relative to valve seat 54a in response to the level of condensate in chamber 58. When the condensate level is low, valve elements 64 engages seat 54a to close the outlet from chamber 58, as indicated by the broken line position of valve element 64 in FIG. 2. It will be appreciated that valve element 64 is biased to the latter position by its own weight and that of float 62 and, in accordance with one aspect of the present invention, valve element 64 is further biased toward engagement with valve seat 54a by the force of exhaust gas against flat upper end 72 of the float. The weight of the float and valve element assures sealing of the outlet from chamber 58 when the condensate level is above the location of valve seat 54a but below the level required to elevate float 62, thus to preclude the blowing of condensate through the chamber outlet. Moreover, such sealing also precludes the flow of exhaust gases through the condensate chamber outlet should the condensate level recede below the level of valve seat 54a. In either event, the sealing effect is supplemented by the force of exhaust gas against the top of float 62 when the forced draft apparatus is in operation. During operation of the forced draft apparatus, condensate enters chamber 58 through entrance end 58a and, upon accumulating in chamber 58, eventually elevates float 62 and thus valve element 64 from the broken line towards the solid line positions thereof shown in FIG. 2, thus to open the chamber outlet for the condensate to flow therethrough to drain hose 30. As the condensate level recedes float 62 descends to again close the outlet.

Figure 4:
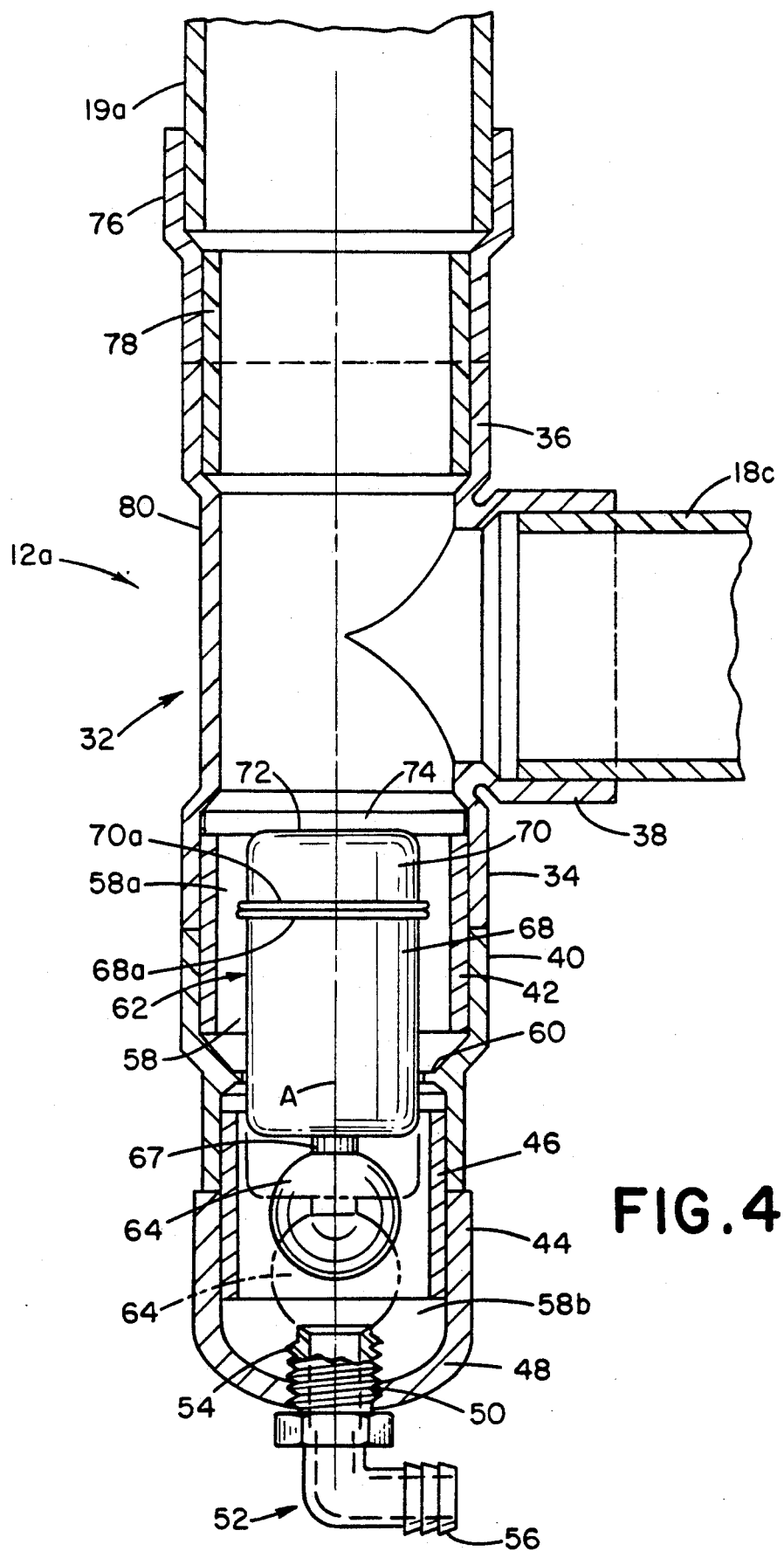

FIG. 4 illustrates another embodiment of a condensate trap in accordance with the present invention, designated generally by the numeral 12a, and which is constructed from the same component parts as in the condensate trap illustrated in FIGS. 1-3. Accordingly, like numerals appear in FIG. 4 to represent corresponding component parts of the condensate trap illustrated in FIGS. 1-3. In the embodiment of FIG. 4, end 34 of T-coupling 32 provides the upper end of the condensate trap housing, branch 38 of the coupling is connected to exit end 18c of the exhaust gas conduit from the water heater, and end 36 of the T-coupling is connected to an exhaust conduit 19a which corresponds to exhaust conduit 19 in FIG. 1 of the drawing. In this embodiment, end 36 of T-coupling 32 is connected to an off-the-shelf plastic expander 76 by means of a sleeve of plastic pipe 78 therebetween whereby, assuming the T-coupling to be of the same dimensions as that of the T-coupling in FIG. 1, the diameter of exhaust conduit 19a would be larger than that of exhaust conduit 19 in FIG. 1.

As mentioned above, end 34 of T-coupling 32 provides the upper end of the condensate trap housing and, as will be appreciated from FIG. 4, opens downwardly with respect to exit end 18c of the exhaust gas conduit. End 34 is connected to reducer coupling 40 by means of sleeve 42, and end cap 44 is interconnected with the lower, reduced diameter portion of reducer 40 by means of sleeve 46. L-coupling 52 is interconnected with end cap 44 as described hereinabove with regard to the trap illustrated in FIGS. 1-3 to provide an outlet from the condensate trap. The interior of the housing as defined by T-coupling end 34, reducer 40 and end cap 44 provides a condensate chamber 58 having an upper end 58a providing a condensate inlet which is open to exit end 18c of the exhaust conduit and a lower end 58b which is below the inlet and provided with the condensate outlet as defined by L-coupling 52. As in the earlier embodiment, condensate level responsive float 62 is disposed in condensate chamber 58 and carries a spherical valve element 64 for opening and closing the outlet passage from chamber 58 provided by leg 54 of coupling 52. Further as in the earlier embodiment, reducer 40 has a radially inwardly extending circumferential flange 60 which serves to guide vertical displacement of float 62 relative to axis A. A stop pin 74 is interposed between sleeve 42 and end 34 of T-coupling 32 to limit upward displacement of float 62 in chamber 58.

As will be appreciated from FIG. 4 and the foregoing description, operation of the condensate trap in response to the level of condensate in chamber 58 is the same as that described hereinabove in connection with the embodiment illustrated in FIGS. 1-3. Advantageously in connection with the embodiment illustrated in FIG. 4, the vertical disposition of ends 34 and 36 of T-coupling 32 minimizes the possibility of condensate being entrained in the exhaust gas stream so as to bypass entrance end 58a of condensate chamber 58. More particularly in this respect, the vertical disposition provides for coupling wall 80 opposite branch 38 to be transverse to the axis of the latter, whereby exhaust gases moving through exit end 18c toward exhaust conduit 19a impinge against wall 80 enabling condensate in the exhaust gas stream to collect on the latter and drop by gravity into entrance end 58a of the condensate chamber. Further, condensate remaining in the gas stream and moving upwardly therewith toward exhaust conduit 19a will tend to collect on the interior surfaces of sleeve 78 and conduit 19a and drop by gravity into the condensate chamber.

While considerable emphasis has been placed on the preferred embodiments herein illustrated and described, it will be appreciate that other embodiments of the invention can be made and that modifications can be made in the preferred embodiments without departing from the principles of the invention. In particular in this respect, it will be understood that other condensate level responsive arrangements can be provided for controlling the valve element by which the condensate chamber is opened and closed to the flow of condensate therefrom. Likewise, it will be understood that the housing providing the condensate and float chamber can be constructed other than illustrated and described herein and can be mounted on the exhaust conduit of the apparatus with which the condensate drain is associated other than through a standard plastic coupling component which serves as a portion of the condensate drain housing. These and other modifications of the preferred embodiment as well as other embodiments of the invention will be suggested or obvious from the embodiments disclosed herein, whereby it is to be distinctly understood that the foregoing descriptive matter is to be interpreted merely as illustrative of the invention and not as a limitation.

Having thus described the invention, it is claimed:

1. A trap for condensate in combustion gases flowing through an exhaust gas conduit from gas fired forced draft liquid heating apparatus comprising, housing means providing a chamber having a condensate inlet open to said conduit and a condensate outlet below said inlet, valve means for opening and closing said outlet, and means responsive to the level of condensate in said chamber for actuating said valve means to open and close said outlet, said valve means including a valve seat and a valve element displaceable to engage and disengage said valve seat respectively to close and open said outlet, and said level responsive means including float means in said chamber for displacing said valve element toward and away from said valve seat, and means separating and interconnecting said float means and said valve element.

2. A trap according to claim 1, wherein said level responsive means biases said valve means to close said outlet.

3. A trap according to claim 1, wherein said level responsive means provides for the level of condensate in said chamber to be above said outlet when said valve closes said outlet.

4. A trap according to claim 1, wherein said float means has end means adjacent said inlet to said chamber whereby said float means is biased by gases flowing through said exhaust gas conduit to displace said valve element toward said valve seat.

5. A trap according to claim 1, wherein said valve element and said valve seat are in said chamber.

6. A trap according to claim 5, wherein said means to displace said valve element includes float means in said chamber and means interconnecting said float means and valve element.

7. A trap according to claim 5, wherein said valve seat has a vertical axis and said means to displace valve element includes vertically displaceable float means in said chamber above said valve seat and coaxial with said axis.

8. A trap according to claim 7, and means in said chamber to guide vertical movement of said float means.

9. A trap according to claim 7, wherein said float means has end means adjacent said inlet to said chamber whereby said float means is biased toward said valve seat by gases flowing through said exhaust gas conduit.

10. A trap according to claim 9, and means in said chamber to guide vertical movement of said float means.

11. A trap according to claim 10, and stop means to limit displacement of said float means away from said valve seat.

12. A trap according to claim 11, wherein said stop means includes pin means extending across said chamber adjacent said inlet.

13. A trap according to claim 7, and stop means to limit displacement of said float means away from said valve seat.

14. A trap for condensate in combustion gases flowing through exhaust gas conduit means from gas fired, forced draft, liquid heating apparatus comprising, cylindrical housing means having a vertical axis and upper and lower ends, said upper end being open and including means for connecting said housing means to said exhaust gas conduit means, said lower end including an end wall, means providing an outlet opening through said end wall coaxial with said axis, a float in said housing means between said upper and lower ends, said float being vertically displaceable toward and away from said outlet opening in response to the level of condensate in said housing means, a valve element and means separating and interconnecting said float and said valve element and movable therewith to actuate said valve element to close and open said outlet opening.

15. A trap according to claim 14, wherein said upper end of said housing means includes coupling means having opposite ends on an axis transverse to said vertical axis, said opposite ends providing means for connecting said trap to said exhaust conduit means.

16. A trap according to claim 14, wherein said housing means includes radially inwardly extending flange means between said upper and lower ends for guiding vertical displacement of said float.

17. A trap according to claim 14, wherein said means providing an outlet opening is a tubular fitting secured to said end wall and having an entrance end coaxial with said axis and facing said valve element.

18. A trap according to claim 17, wherein said entrance end provides a valve seat and said valve element has a spherical shape for engaging said seat to close said outlet opening.

19. A trap according to claim 18, wherein said upper end of said housing means includes coupling means having opposite ends on an axis transverse to said vertical axis, said opposite ends providing means for connecting said trap to said exhaust conduit means.

20. A trap according to claim 19, wherein said housing means includes radially inwardly extending flange means between said upper and lower ends for guiding vertical displacement of said float.

21. A trap according to claim 20, and means adjacent said open upper end of said housing means to limit displacement of said float away from said outlet opening.

22. A trap according to claim 21, wherein said means to limit displacement of said float away from said outlet opening includes pin means extending transverse to said vertical axis.

23. A trap according to claim 14, wherein said upper end of said housing means includes coupling means having a first end on an axis transverse to said vertical axis and a second end coaxial with said vertical axis, said first and second ends providing means for connecting said trap to said exhaust conduit means.

24. A trap according to claim 23, wherein said housing means includes radially inwardly extending flange means between said upper and lower ends for guiding vertical displacement of said float.

25. A trap according to claim 24, and means adjacent said open upper end of said housing means to limit displacement of said float away from said outlet opening.

26. A trap according to claim 25, wherein said means to limit displacement of said float away from said outlet opening includes pin means extending transverse to said vertical axis.

27. A trap for condensate in combustion gases flowing through an exhaust gas conduit from a gas fired, forced draft, liquid heating apparatus, said trap comprising:
a cylindrical housing means;
a chamber within said housing means adapted to collect said condensate, said housing means comprising a reducer coupling having a radially inwardly extending circumferential flange having an internal diameter, said chamber having a condensate inlet open to said conduit and a condensate outlet below said inlet, said housing means also including a stop pin interposed in said condensate inlet;

a valve seat located at said condensate outlet;

a valve element adapted to engage and disengage said valve seat to respectively open and close said outlet;

a float means disposed above said valve element in said chamber for displacing said valve element, said float means comprising an outer shell component having an external diameter closely corresponding to said internal diameter of said circumferential flange for guiding vertical movement of said float means, a flat upper end adjacent said condensate inlet of said chamber and a bottom end, said float means upward displacement limited by said stop pin; and a stem secured to said bottom of said float and to said valve element for separating and interconnecting said float means and said valve element.

28. A trap according to claim 27, wherein said valve element, said float means, and said means separating and interconnecting said float means and said valve element form a unitary valve structure, said unitary valve structure has a weight, and said unitary valve structure is biased toward said valve seat by said weight.

29. A trap according to claim 28, wherein said float means is biased by gases flowing through said exhaust gas conduit to displace said unitary valve structure toward said valve seat.

* * * * *